June 2, 1925.
W. C. HIERING
1,540,004
BAG FASTENER AND METHOD OF MAKING SAME
Filed April 10, 1924
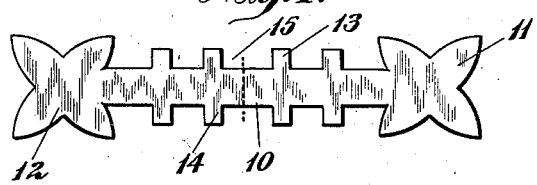
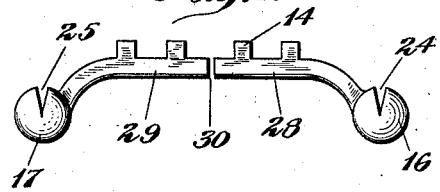
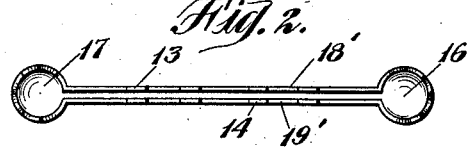
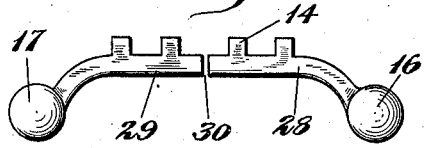
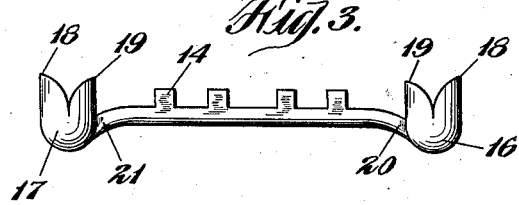
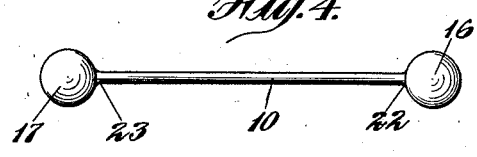
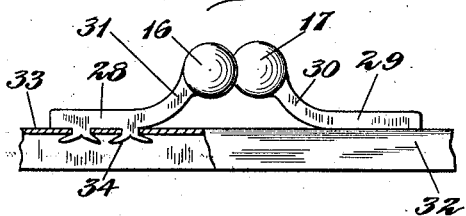
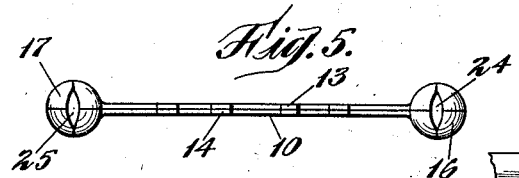
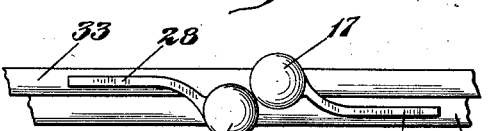
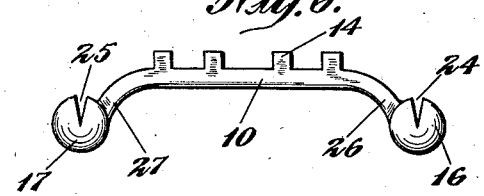
INVENTOR.
William C. Hiering
BY
Fredk C. Fischer
ATTORNEY.

Patented June 2, 1925.

1,540,004

UNITED STATES PATENT OFFICE.

WILLIAM C. HIERING, OF NEWARK, NEW JERSEY, ASSIGNOR TO J. E. MERGOTT CO., OF NEWARK, NEW JERSEY, A CORPORATION OF DELAWARE.

BAG FASTENER AND METHOD OF MAKING SAME.

Application filed April 10, 1924. Serial No. 705,718.

*To all whom it may concern:*

Be it known that I, WILLIAM C. HIERING, a citizen of the United States, residing at Newark, county of Essex, and State of New Jersey, have invented certain new and useful Improvements in Bag Fasteners and Methods of Making Same, of which the following is a specification.

This invention relates to improvements in bag fasteners, preferaby of the ball type, for ladies' hand bags, pocket-books, etc., and in the method of making the same.

The principal object of the invention is to construct, from a single piece of suitable material, bag frame fasteners, provided with a knob or ball member adapted for frictional engagement with each other, so that when the frame members are closed the ball members of the fasteners come together in a locked position with a pronounced snap.

Another object of the invention is the provision of a fastener, the ball members of which are closed after the fasteners are plated in order to prevent rusting by the fluid entering and retained within said balls during plating, thereby allowing a perfect drying of the interior of the balls before closing the same.

A further object of the invention is to provide a novel method of making such fasteners whereby a great saving in material, time and labor is effected and a fastener is produced which is extremely durable and comparatively inexpensive.

The invention accordingly consists, first, in the formation of a blank which, in its preferred embodiment has substantially star-shaped flat bodies at its ends connected by a bar which is provided intermediate the end members on its opposite side edges with pairs of prongs. The blank is thus used for simultaneously making two fasteners. It is, however, to be understood that instead of employing a blank as illustrated in Figure 1 of the drawing, a blank one-half as long, as indicated by the dotted line in said figure, may be employed, which would result in making only a single fastener. Second, the method furthermore consists, in cusping and channeling the blank, third, in flattening the bar between its cusped end members, fourth, in closing the cusps preliminarily and leaving a small opening in their walls, fifth, in bending the ends of the bar in the same plane, sixth, in cutting the blank into two homogeneous parts, seventh, in plating these parts, and eighth, in closing the cusps to form balls.

These and other objects of my invention will become more fully known as the description thereof proceeds, and will be specifically pointed out in the appended claims.

In carrying the invention and method into practice for producing the novel fastener, I proceed in the manner illustrated in the accompanying drawing intended to illustrate the consecutive steps of the method and the finished product, and in which:

Figure 1 is a top plan view of a blank from which two mating members of a bag fastener are formed according to my method, and illustrates the first step of my improved method.

Figure 2 is a top plan view illustrating the second step of my method, i. e., the cusping and channeling of the blank.

Figure 3 is a side view of the cusped and channeled blank.

Figure 4 is a bottom plan view of the cusped and channeled blank, figure 3, illustrating the third step of my method, i. e., the flattening of the bar.

Figure 5 is a top plan view illustrating the fourth step of my method according to which the cusps are partially closed as shown, to leave an opening in the ball walls.

Figure 6 is a side elevation illustrating the fifth step of my method, i. e., the bending of the ends of the connecting bar of the balls downwardly however in the same plane.

Figure 7 is a side elevation illustrating the sixth step of my method, i. e., the cutting of the blank into two homogenous parts before plating.

Figure 8 illustrates in side elevation the cut blank and the seventh step of my method i. e., the closing of the balls after plating and drying.

Figure 9 is a side elevation, partly in section of the finished fasteners attached to a bag frame.

Figure 10 is a top plan view illustrating the finished fasteners with the ball members thereof in frictional and resilient engagement for closing the bag.

The blank from which the fastener is made is shown in top plan view in Figure 1, and comprises a flat metal bar 10, the ends of which are substantially star-shaped, for instance as shown by way of example, to form two four-pointed stars 11 and 12. Intermediate these stars the bar 10 is formed with pairwise arranged projections or prongs 13 on one side edge and 14 on the opposite side edge of the bar in such manner as to leave between the central pair of prongs 13, 14 a space 15, which is wider than the spaces separating the other pairs of prongs from each other and from the star ends.

This formation of the blank constitutes the first step of my method.

The second step of my method is illustrated in top plan view in Figure 2, in which the blank is cusped at the ends and channeled along a longitudinal median line, to form the cusps 16 and 17 and parallel shanks 18' and 19' by folding the material of the blank upon itself.

As illustrated in the side elevation in Figure 3, the cusps 16 and 17 have each a pair of outer lips 18 which are somewhat higher than the pair of inner lips 19 on account of the channeling of bar 10 during which operation the metal of the star blanks on the inner faces is slightly drawn or bent during the formation of the cusps as at 20 and 21.

The third step of my method is illustrated in Figure 4, representing a bottom plan view in which the bar 10 is shown flattened between the points 22 and 23.

The fourth step of my method is illustrated in Figure 5, in which the cusps are shown partially closed to leave openings 24 and 25 for a purpose to be hereinafter more fully explained.

The fifth step of my method is illustrated in Figure 6, in which the ends of the bar 10 are shown bent in the same lateral plane to provide curved parts 26 and 27.

In Figure 7, the sixth step of my method is illustrated, in which the bar 10, shown in side elevation, is cut approximately at its center, as at 30, to form two homogeneous parts 28 and 29 respectively, after which they may be plated.

In Figure 8 the seventh step of my method is illustrated by a side elevation of the cut bar 10 forming the homogeneous parts 28 and 29 and the cusps 16 and 17 are shown closed, to form balls, which is done after they have been dried to eliminate all moisture collected therein during plating.

In Figure 9 is illustrated the bending of the parts 28 and 29 with the closed balls 16 and 17 thereon bent out of the lateral plane as at 30 and 31, while the parts 28 and 29 are secured to the upper faces of the opposing upper channel bars 32 and 33 of a bag frame. The flattened prongs 13 and 14 are split open as at 34 to engage the bottom of the channel bars.

Figure 10 illustrates in top plan view the frictional and resilient engagement of the two ball members 16 and 17 holding the bag frame members 32 and 33 together.

It will be clear that such changes may be made in the consecutive order of my method steps and in the construction of the minor details of my invention as fall within the scope of the appended claims without departing from the spirit of the invention.

Having thus described my invention, what I claim as new and desire to secure by Letters Patent is:

1. Method of making bag fasteners which consists in forming a bar with open cusps at its ends and prongs between said cusps, cutting said bar into homogeneous parts, plating the said fasteners and closing said cusps.

2. Method of making bag fasteners which consists in forming a flat bar with open end cusps and prongs between the ends, folding said bar upon itself, flattening said bar between the cusps, dividing it, plating said fasteners and then closing said cusps.

3. Method of making bag fasteners which consists in forming a flat blank with star-shaped ends, and prongs intermediate said ends, shaping said star-ends into open cusps, channeling said blank, flattening it intermediate the ends, bending it in the same lateral plane, cutting said blank in its center, plating said fasteners and closing said cusps to form balls.

4. As an article of manufacture, a bag frame fastener made from a single blank of suitable material, one end of said blank being provided with a star-shaped element to form cusps and the other end provided with oppositely disposed prongs, the said cusps adapted to be formed into balls after the said fasteners are plated.

5. As an article of manufacture, a bag frame fastener made from a single blank of suitable material adapted to be folded upon itself, the ends of said blank being provided with star-shaped elements adapted to be formed into cusps when said blank is folded, and the part connecting said elements provided with pairwise arranged oppositely disposed prongs adapted to engage pairwise when said blank is folded and said cusps adapted to be formed into balls after the fastener is plated.

6. As an article of manufacture, a bag fastener made from a flat blank with star-shaped ends, the intermediate portion being formed with oppositely disposed prongs, the said star-shaped ends adapted to be formed into cusps simultaneously with the flattening of the said intermediate portion, and said cusps adapted to be formed into balls after the fasteners are plated.

This specification signed and witnessed this eighth day of April, 1924.

WILLIAM C. HIERING.

Witnesses:
W. H. CONKLIN,
FREDK. C. FISCHER.